(12) United States Patent
Bickford

(10) Patent No.: US 6,986,523 B1
(45) Date of Patent: Jan. 17, 2006

(54) ADJUSTABLE BOAT TRAILER STEP ASSEMBLY

(76) Inventor: Arthur O. Bickford, 110 Rockliff La., McMinville, TN (US) 37110

( * ) Notice: Subject to any disclaimer, the term of this patent is extended or adjusted under 35 U.S.C. 154(b) by 0 days.

(21) Appl. No.: 10/843,067

(22) Filed: May 11, 2004

(51) Int. Cl.
    *B60R 3/02* (2006.01)
(52) U.S. Cl. .................................. 280/414.1; 280/166
(58) Field of Classification Search ............ 280/414.1, 280/163, 166, 164.1, 763.1, 766.1; 248/689
    See application file for complete search history.

(56) References Cited

U.S. PATENT DOCUMENTS

| | | | | |
|---|---|---|---|---|
| 116,938 A | * | 7/1871 | Shields et al. ............... | 36/7.3 |
| 160,035 A | * | 2/1875 | Stodola et al. ............... | 220/62 |
| 3,762,742 A | * | 10/1973 | Bucklen ..................... | 280/166 |
| 3,980,319 A | * | 9/1976 | Kirkpatrick ................. | 280/166 |
| 4,312,515 A | * | 1/1982 | Allori ........................ | 280/166 |
| 4,943,076 A | | 7/1990 | Tripke | |
| 6,149,172 A | * | 11/2000 | Pascoe et al. ............... | 280/166 |
| 6,511,086 B2 | * | 1/2003 | Schlicht ..................... | 280/166 |

* cited by examiner

*Primary Examiner*—Lesley D Morris
*Assistant Examiner*—Michael T. Nguyen
(74) *Attorney, Agent, or Firm*—Joseph H. Beumer

(57) ABSTRACT

A boat trailer step assembly is provided with several features making the assembly adjustable in several respects, allowing the step to be placed at varying positions for different trailers and boats. The step is mounted on a support member made of overlapping parts that can be extended or contracted to obtain different heights. The support member is connected to a rotatable plate at a 45 degree angle. This allows the step to be extended outward in various directions. Adjustment of the step location in a generally front-to-rear direction is provided by sliding a clamping device along a beam of the trailer on which it is mounted.

8 Claims, 4 Drawing Sheets

ADJUSTABLE BOAT TRAILER STEP ASSEMBLY

FIELD OF THE INVENTION

This invention relates to steps for boat trailers and mere particularly to assemblies for such steps with a high degree of adjustability for use under varying conditions.

BACKGROUND OF THE INVENTION

In the course of launching a boat, the boat trailer is typically backed into the water until the boat floats, and the boater stands on the trailer frame to unhook a front strap to release the boat and to climb aboard. Trailers have a front end structure including a tongue in the form of a beam extending along the center of the trailer and a pair of side rail support beams which are connected to other boat-supporting frame sections. Standing on the tongue during launching or retrieving is inconvenient and may be unsafe because portions of the tongue may be submerged in water, resulting in poor footing. Another disadvantage of standing on the tongue is that the level of the tongue is generally as low as 30 to 36 inches below the boarding level of the boat, and a winching reel and supporting post mounted on the tongue may interfere with access. It would be desirable to provide a step-supporting assembly in which the step is elevated above the level of the tongue, and provides for adjustment in placement of the step in forward to rear location, and at various rotational angles as well as variations in height.

The step assembly should also provide safety features by measures including use of a skid-resistant surface on the step and enabling the step to be placed in a position that makes the step readily visible to the user.

SUMMARY OF THE INVENTION

The present invention is directed to a boat trailer step assembly in which a step is mounted on an angularly extending support member which places the step in a position outward and upward away from the lower end of the support member. Variations in location of the step are enabled by providing for adjustments in length of the support member, by partial rotation of the support member at its lower end and by sliding a clamping device connected to the lower end of the support member to a selected position on a side rail beam engaged by the clamping device.

Length of the support member, and its resulting height may be made adjustable by use of upper and lower sections for this member, with the upper and lower sections being overlapped and telescoped so that bolt holes at various locations along the length of the sections may be selected to obtain a desired elevation.

Rotation of the support member to allow it to be extended in a selected direction may be provided for by mounting the lower end of the support member on a rotatable plate which engages a base plate, the base plate being disposed above and connected to a clamping device engaging a side rail horizontal beam of the trailer. An axially extending bolt secures the plates for rotation, and one of the plates is provided with a plurality of holes alignable with a hole through the other at the periphery of the plates. A pin or bolt and preferably a spring-loaded pin is inserted through the aligned holes. This enables the support member to be rotated and pointed in a selected direction.

In addition to enabling the step to be placed in a convenient position for performing tasks on a stationary boat and trailer, the invention provides for quickly placing the step in a "run" position, which involves moving the step position closer to the tongue for travel on the highway.

A combination of the various adjustments is likely to be needed to obtain an optimum location for different sizes and shapes of boats and trailers and for different purposes.

It is therefore an object of this invention to provide an assembly for mounting a step on a boat trailer in a manner such that numerous adjustments to placement of the step may be easily accompolished.

DESCRIPTION OF THE PREFERRED EMBODIMENT

Figure 1:
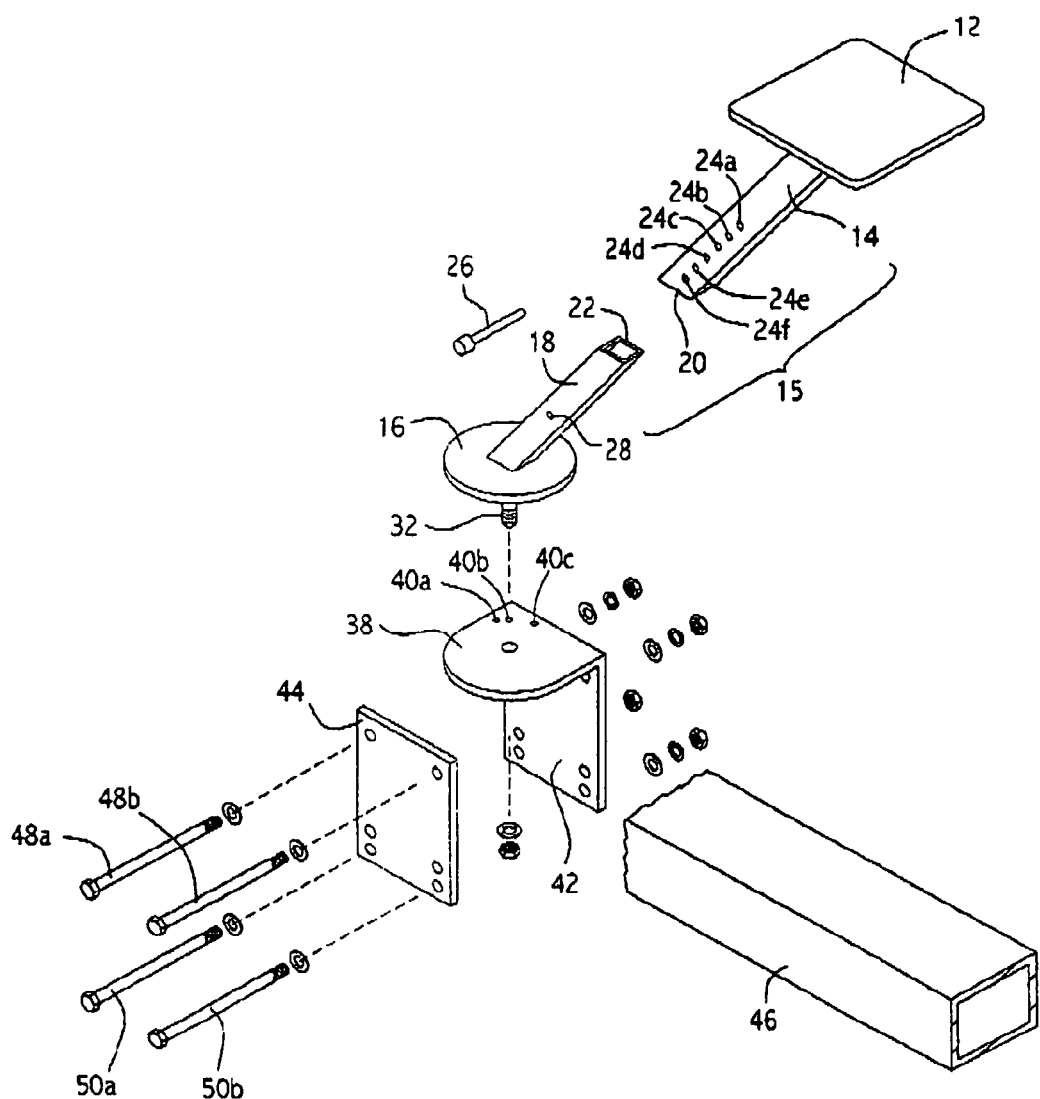
FIG. 1 is an exploded view showing components of the boat trailer step assembly.

Referring to FIG. 1 of the drawings, components of a trailer step assembly 10 are shown. A step 12 having a non-skid surface is connected to an upper section 14 of a support member 15, and a rotatable plate 16 is connected to a lower section 18. Both the step and the rotatable plate placed at an angle such as 45 degrees to enable the step to be extended outward at the top. The upper section and the lower section may be comprised of square metal tubing of different sizes which provides for overlapping of ends 20 and 22 and adjusting the length of the support member by sliding the smaller tube inside the larger one. The upper section 14 is provided with a series of spaced-apart bolt holes 24a through 24f, which allows a bolt or pin 26 to be extended to a selected hole of the series and through a single hole 28 in the lower section. This enables the elevation of the step to be adjusted to a selected position.

Figure 4:
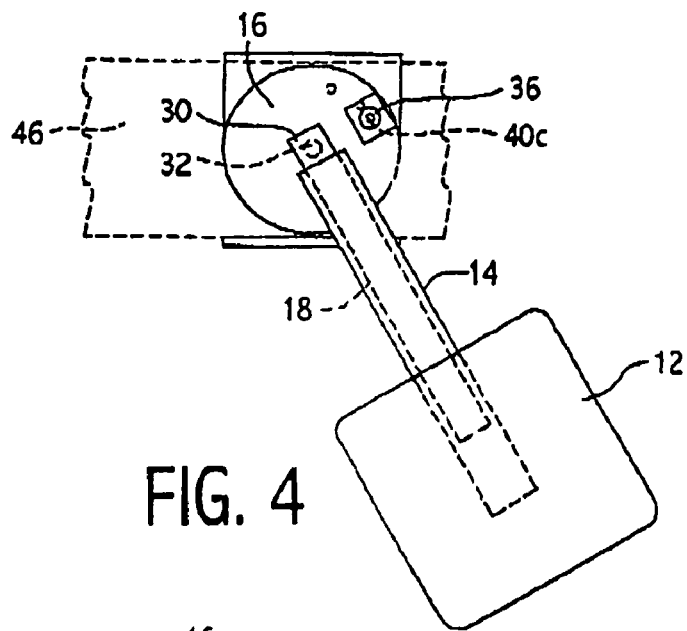
FIGS. 4 through 6 are views from above showing the step at various angular positions obtained by rotation of a mounting plate.
Figure 5:
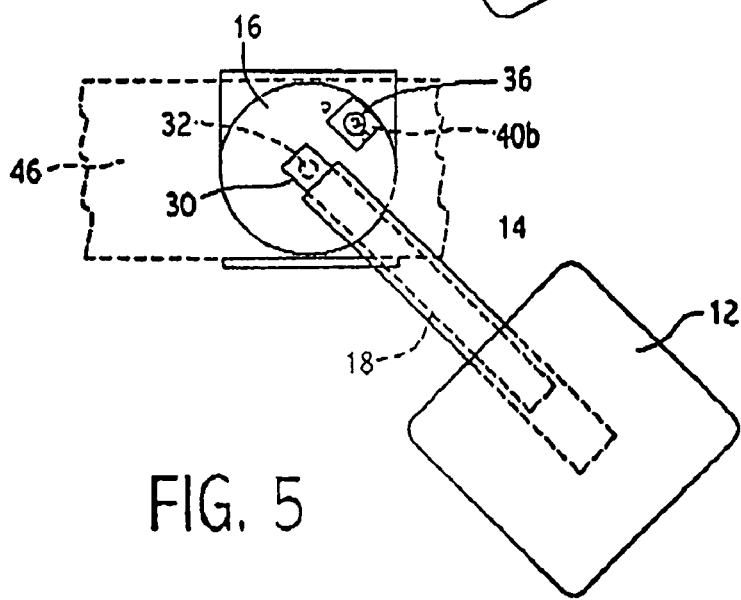
Figure 6:
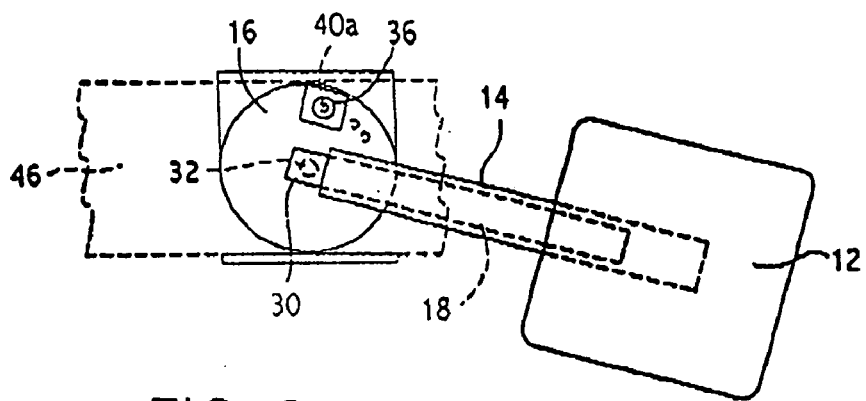

Plate 16 as shown in FIGS. 4–6 has a central bolt hole 30 receiving an axially aligned bolt 32 and a single opening 34 near the periphery of the plate, receiving a second bolt or pin 36, preferably a spring-driven pin, which may be inserted through a selected one of a plurality of peripheral openings 40a, 40b or 40c in a mating plate 38. This plate is integral with and disposed at a right angle to clamping plate 42 which is aligned for connection to an opposed plate 44 for securing the assembly to a side rail 46 of the trailer. FIGS. 4–6 demonstrate available variations in direction of extending the step, based on selection of a different bolt hole. FIG. 4 shows the step in the "run" position, with the step located near to the tongue. In FIG. 5 the step is rotated to a medium position suitable for most V-bottom boats. The position shown in FIG. 6 is suitable for larger boats or flat aluminum boats.

Figure 3:
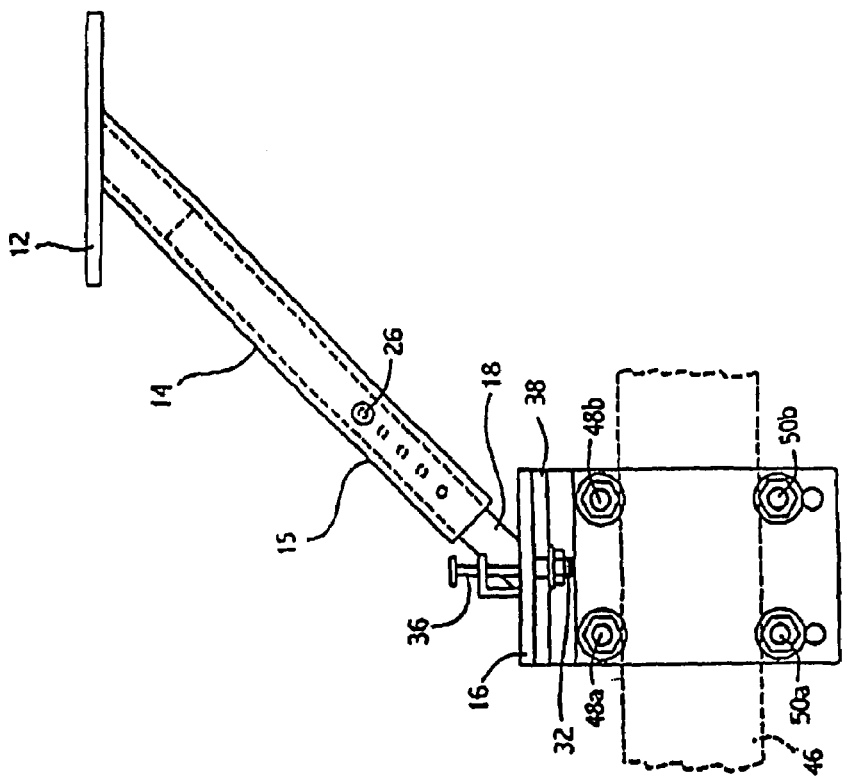
FIG. 3 is a side view of the assembly with the step fully extended.
Figure 2:
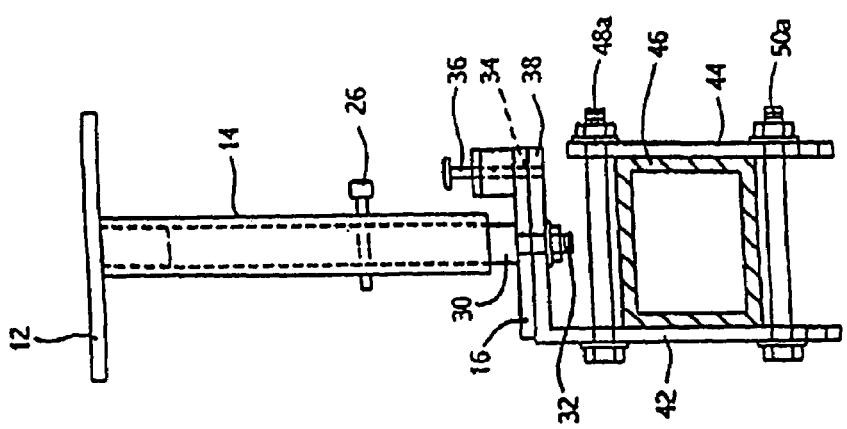
FIG. 2 is a front view showing the assembly mounted on a side rail beam of a trailer.

FIG. 2 and FIG. 3 show the assembly connected to a side rail 46 of a trailer by means of clamping plates 42,44 secured by upper bolts 48a, 48b and lower bolts 50a,50b extending through aligned holes the plates. Variation of location of the step in a generally front-to-rear direction by placing the clamping plates at different places along the side rail beam.

FIG. 3 shows the support member 15 length adjusted to a relative short height by overlapping upper and lower parts over a near maximum distance. Increasing the length of the support member may be easily done by sliding the upper portion upward and securing this location by inserting a bolt or pin through appropriate holes.

Figure 7:
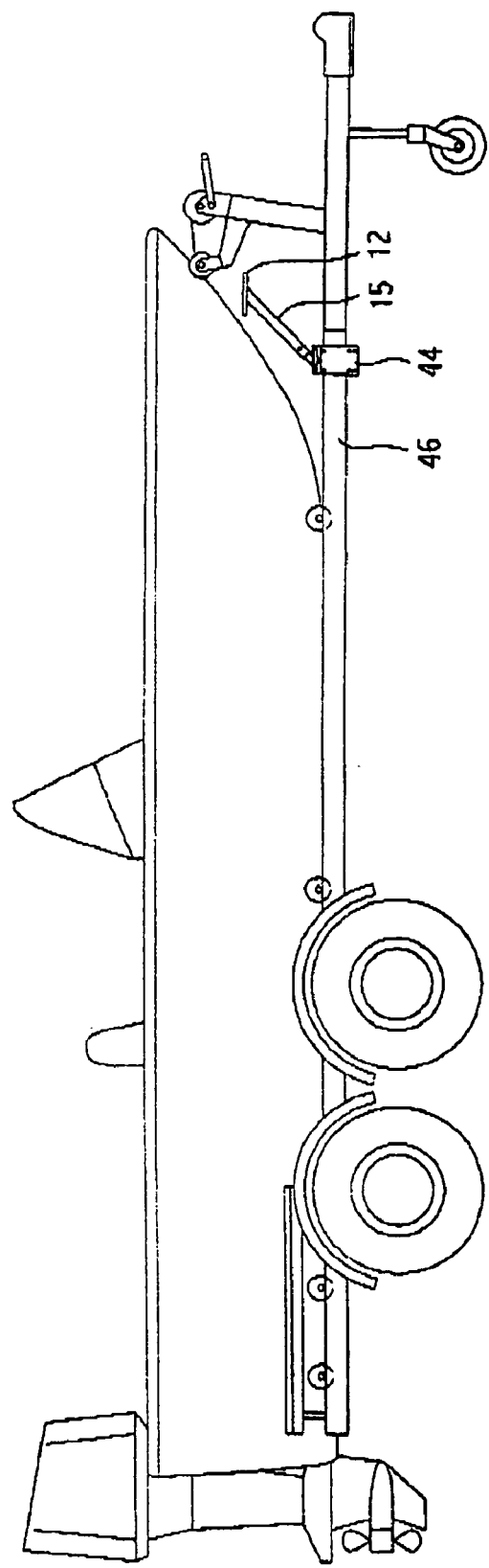
FIG. 7 is a side view showing a aboat and trailer with a step mounted on the trailer.

FIG. 7 shows a typical placement of a step 12 on a boat trailer, the support member 15 connected to side rail 46 by means of clamp 44. In this position the step is readily visible to the user and is located well above the level of the tongue of the trailer.

While the invention is described above with reference to specific embodiments it is not to be understood as so limited, but is limited only as indicated by the appended claims.

What is claimed is:

1. A boat trailer carried step assembly comprising:
    a step;
    an elongated support member having an upper end and a lower end, said step connected to said upper end and adapted to be disposed horizontally;
    a first, rotatable plate connected to said lower end;
    said support member extending upward angularly and outwardly, projecting said step away from vertical alignment with said plate;
    a second plate mated with said first plate;
    a clamping device connected to said second plate and to said trailer;
    said support member comprising an upper portion and a lower portion connectable to one another at variable lengths, thereby raising or lowering said step;
    said second plate having a plurality of peripheral openings and said first plate having an opening alignable with a selected one of said peripheral openings;
    a connecting bolt or pin insertable in said aligned openings to obtain a rotated position; and
    said clamping device is adapted to be placed at adjusted positions on said trailer.

2. The assembly as defined in claim 1 wherein said support member is comprised of rectangular metal tubing.

3. The assembly as defined in claim 2 wherein said portions are different from one another in size whereby one of said portions may be slid within the other to adjust the length of the support member.

4. The assembly as defined in claim 3 wherein said support member is disposed at an angle of 45 degrees with relation to said step and said first plate.

5. The assembly as defined in claim 4 including an axially disposed pin or bolt connected to said first plate and rotatably engaging a central opening defined in said second plate.

6. The assembly as defined in claim 5 wherein said trailer has a side rail beam and said clamp is connected to said beam.

7. The assembly as defined in claim 6 wherein said clamping device comprises a pair of opposing plates bolted together.

8. The assembly as defined in claim 1 wherein said pin is a spring-driven pin.

* * * * *